United States Patent [19]

Busch-Sorensen

[11] Patent Number: 5,023,846
[45] Date of Patent: Jun. 11, 1991

[54] ULTRASONIC DETECTOR FOR DETECTING A THIN FILM

[75] Inventor: Thomas Busch-Sorensen, Copenhagen, Denmark

[73] Assignee: Eskofot A/S, Glostrup, Denmark

[21] Appl. No.: 490,492

[22] Filed: Feb. 28, 1990

Related U.S. Application Data

[63] Continuation of Ser. No. 222,929, Jul. 22, 1988, abandoned.

[30] Foreign Application Priority Data

Aug. 5, 1987 [DK] Denmark .............................. 4083/87

[51] Int. Cl.$^5$ .............................................. G01S 1/38
[52] U.S. Cl. .................................... 367/127; 367/908; 340/675; 73/159; 73/602
[58] Field of Search ................ 367/118, 93, 124, 126, 367/908, 127; 181/123, 124; 73/159, 602; 340/675, 566, 567, 568

[56] References Cited

U.S. PATENT DOCUMENTS

| | | | |
|---|---|---|---|
| 3,016,460 | 1/1962 | Anderson | 73/159 |
| 3,342,284 | 9/1967 | Baird | 73/159 |
| 4,066,969 | 1/1978 | Pearce et al. | 367/125 X |
| 4,224,613 | 9/1980 | Kaiser et al. | 340/679 |
| 4,368,438 | 1/1983 | Stienstra | 73/159 X |
| 4,446,735 | 5/1984 | Weilacher | 73/159 X |
| 4,473,822 | 9/1984 | Schiffl | 340/675 X |
| 4,494,841 | 1/1985 | Marcus | 367/93 |

FOREIGN PATENT DOCUMENTS

| | | |
|---|---|---|
| 0033552 | 8/1981 | European Pat. Off. |
| 2917510 | 11/1980 | Fed. Rep. of Germany |
| 710124 | 6/1954 | United Kingdom |
| 922765 | 4/1963 | United Kingdom |
| 1331457 | 9/1973 | United Kingdom |
| 1396242 | 6/1975 | United Kingdom |
| 1498742 | 1/1978 | United Kingdom |
| 1533630 | 11/1978 | United Kingdom |

Primary Examiner—Thomas H. Tarcza
Assistant Examiner—Tod Swann
Attorney, Agent, or Firm—Cushman, Darby & Cushman

[57] ABSTRACT

The ultrasound detector for a thin film includes an ultrasound transmitter and an ultrasound receiver. It is generally known that a plastic film introduced into a sound field attenuates the field to a greater or lesser degree. A sound wave of a frequency of e.g. 40 kHz has a wave length of approximately 9 mm in air. When a plastic film of a thickness of, e.g., 0.50–0.10 mm is introduced, the sound field is typically attenuated with 6–20 dB. The the ultrasound detector is formed as a resonator, and the distance between the transmitter and the receiver corresponds substantially to an integral multiple of one half of a wave length. As a result, the obtained sound field is stronger than previously and the attenuation caused by a plastic film between the transmitter and the receiver is higher than previously. Furthermore, the ultrasound frequency is scanned for taking tolerances, such as changes in temperature and humidity of air into account.

9 Claims, 7 Drawing Sheets

ULTRASONIC DETECTOR FOR DETECTING A THIN FILM

This is a continuation of application No. 07/222,929, filed July 22, 1988, which is now abandoned.

FIELD OF THE INVENTION

The present invention relates to an ultrasound detector for detecting a thin films comprising an ultrasound transmitter and an ultrasound receiver.

BACKGROUND ART

It is generally known that a plastic film introduced into a sound field attenuates said field to a greater or lesser degree. The thicker the film in relation to the wave length of the sound wave, the greater the attenuation.

A sound wave of a frequency of e.g. 40 kHz has a wave length of approx. 9 mm in air. When a plastic film of a thickness of e.g. 0.50–0.10 mm is introduced, the sound field is typically attenuated with 6-20 dB. If a reliable detection of a plastic film in a sound field is required and the production tolerances of the transmitter and the receiver are e.g. ±3 dB, an attenuation of only 6 dB will cause problems.

SUMMARY OF THE INVENTION

To obtain a higher attenuation the distance between the transmitter and the receiver corresponds substantially to an integral multiple of one half of a wave length, and the ultrasound frequency is scanned in order to take tolerances, changes in temperature and humidity of air etc. into account. As a result a resonance chamber with standing waves is obtained. When introducing a plastic film the attenuation is thus considerably greater than previously.

BRIEF DESCRIPTION OF THE DRAWINGS

The invention is described in greater detail below and with reference to the accompanying drawings in which.

DESCRIPTION OF THE PREFERRED EMBODIMENT

Figure 1A:
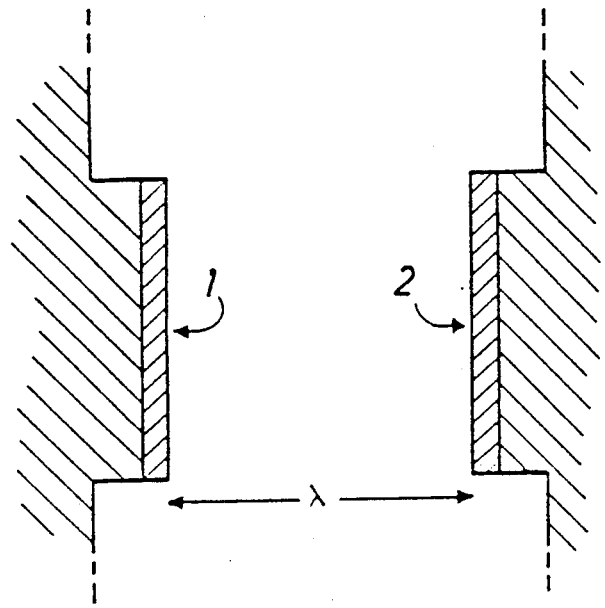
FIGS. 1a, 1b and 1c illustrate an inventive ultrasound detector in form of a resonator and plots of pressure versus distance and particle velocity versus distance and particle velocity versus distance for the space between the transmitter and receiver of the resonator.
Figure 1B:
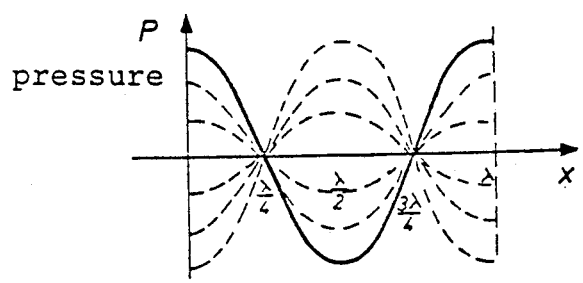
Figure 1C:
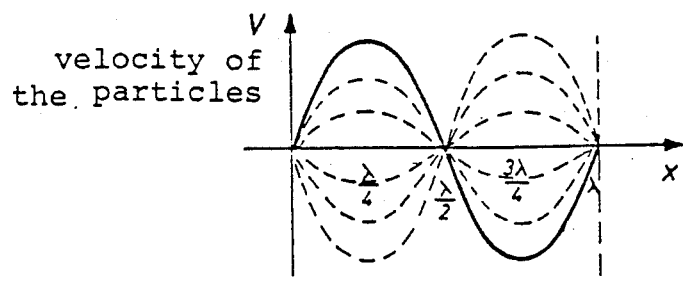
Figures 2, 3:
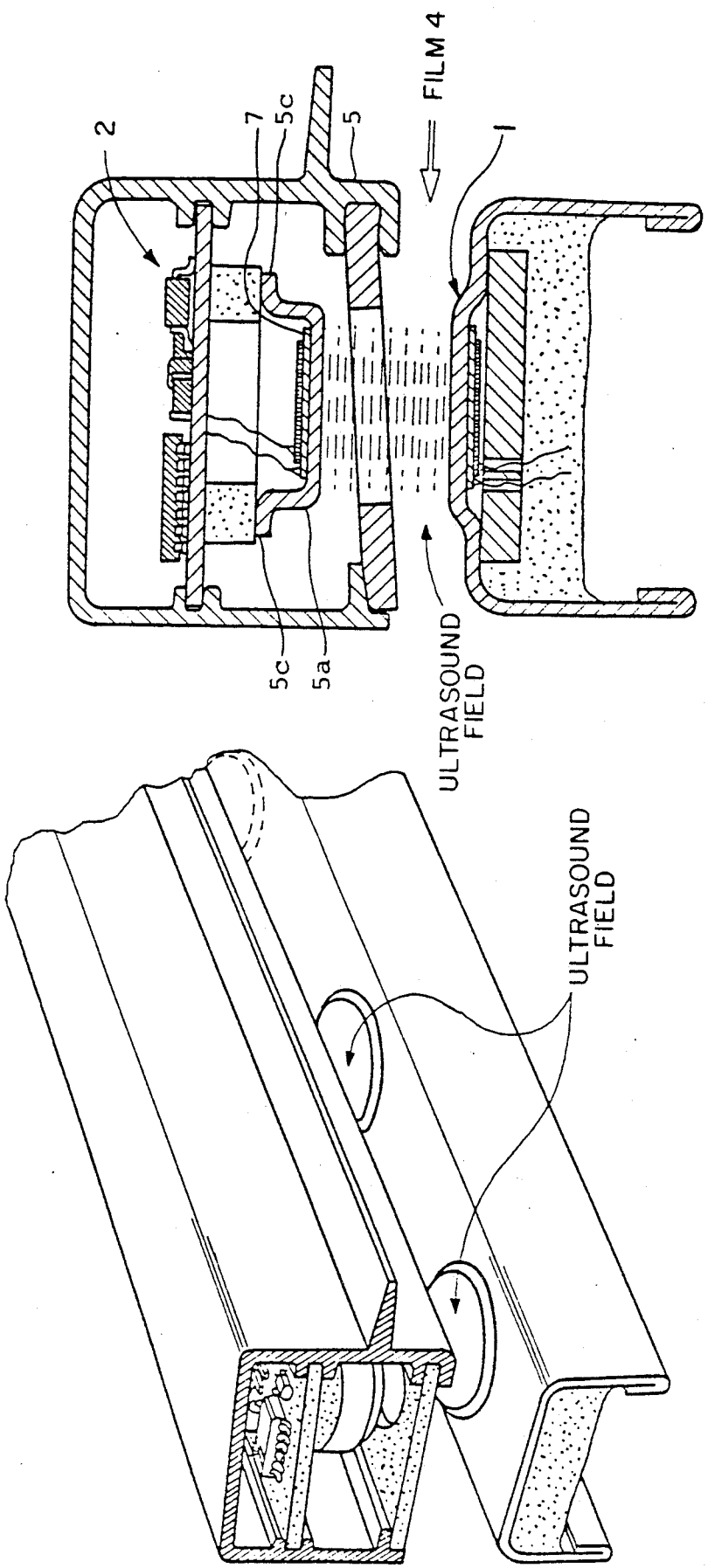
FIG. 2 illustrates an ultrasound detector comprising several transmitters and receivers.
FIG. 3 is a sectional view of the ultrasound detector of FIG. 2.

In FIG. 1a the mutual distance between the ultrasound transducers is exactly one wave length. Variations in sound pressure and velocity of the particles in the resonator between the surfaces of the transmitter 1 and the receiver 2 are illustrated in FIGS. 1b and 1c. When introducing a plastic film 4 in the resonator the signal is considerably attenuated. This is due to amplification in a resonator due to the repeated reflection back and forth from the surfaces 1, 2 of the sound, which in turn results in an attenuation of sound each time it passes a plastic film 4. The highest attenuation is obtained when the plastic film 4 is introduced in an area between the transmitter 1 and the receiver 2, where the velocity of the particles is at a maximum, e.g. at a distance of $\frac{1}{4} \lambda$ or $\frac{3}{4} \lambda$ from either the transmitter 1 or the receiver 2, cf. FIG. 1c. FIG. 2 shows an embodiment, in which the bottom part includes several ultrasound transmitters 1 and the top part includes several ultrasound receivers 2 positioned exactly opposite said transmitters. FIG. 3 is a sectional view of said embodiment.

Figure 4:
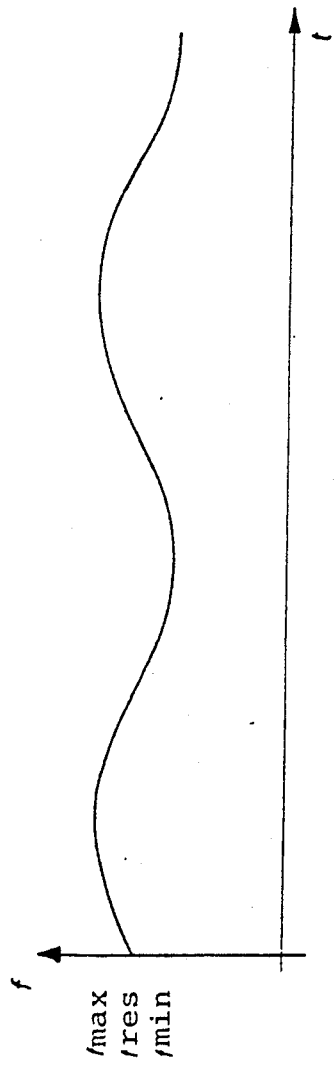
FIG. 4 is a graphic representation of the sequence of the signal fed to each transmitter.
Figure 5:
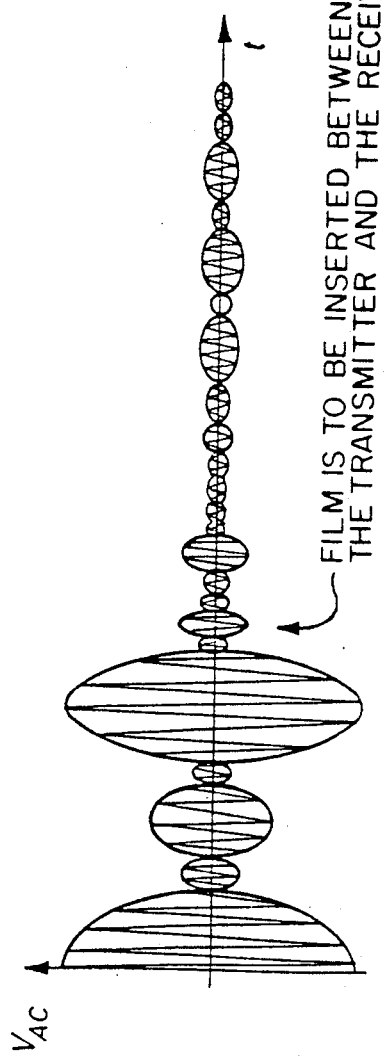
FIG. 5 is a graphic representation of the received signal.
Figure 6:
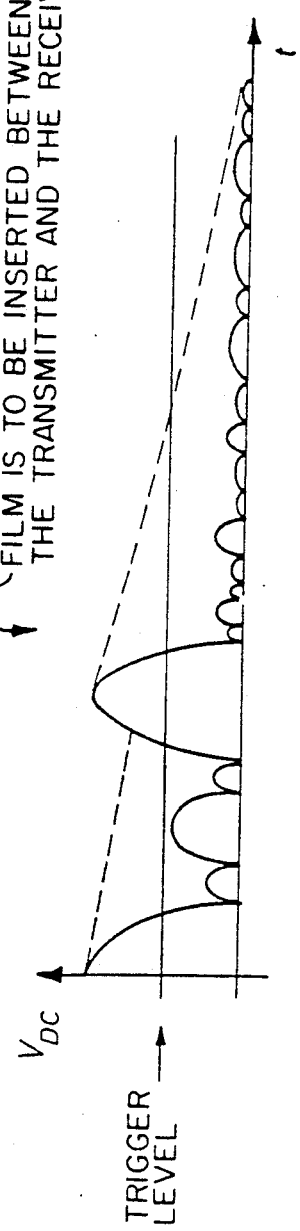
FIG. 6 is a graphic representation of the received signal after being rectified and averaged.

It is often desirable to create a system not reacting to humidity of chemical vapours. Thus, an open ultrasound transducer cannot be used. Instead, a hermetically closed transducer has to be employed, cf. FIG. 3 illustrating the transducer in a small housing 5. Such a transducer has a reduced sensitivity. The transducer comprises a circular metallic membrane 5a fastened along its edge 5c and driven by a glued-on disk 7 of piezoceramic material. When a larger number of transducers is desired, the metallic membranes 5a are advantageously pressed together to form one common plate, cf. FIG. 2. In order to allow channel separation and insulation against sound transmitted through surrounding material the receiver transducers 2 are usually separate and installed acoustically insulated. Since the optimum effect of the system is obtained with resonance in the space between the transmitter 1 and the receiver 2, and since this resonance depends, i.a., on the distance and the humidity and temperature of air, it is usually necessary to frequency-modulate the signal to the transmitter in a multi-channel system, such as in FIG. 2, cf. FIG. 4. As a result, the signal at the receiver is amplitude-modulated, cf. FIG. 5. When the receiver signal is rectified and filtered with a suitable time constant (typically 1/20), a suitable trigger level is introduced to determine whether or not a plastic film 4 has been introduced, cf. FIG. 6.

Components of the transmitter and the receiver

Figure 7:
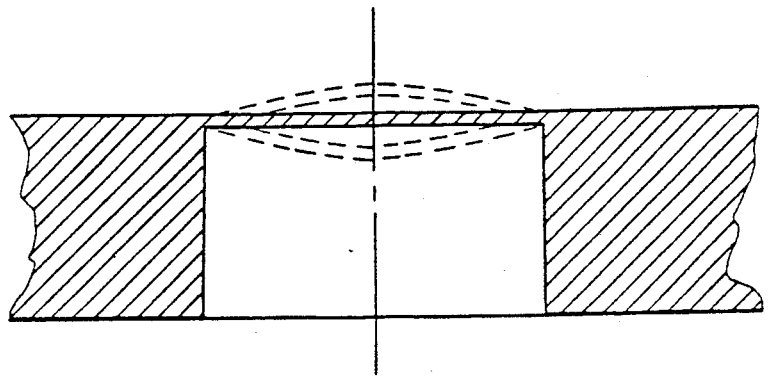
FIG. 7 illustrates a membrane on which the ultrasound transducer is mounted.
Figure 8:
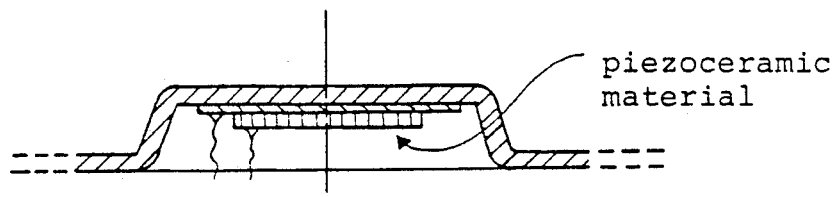
FIG. 8 is an alternative embodiment of the membrane.
Figure 9:
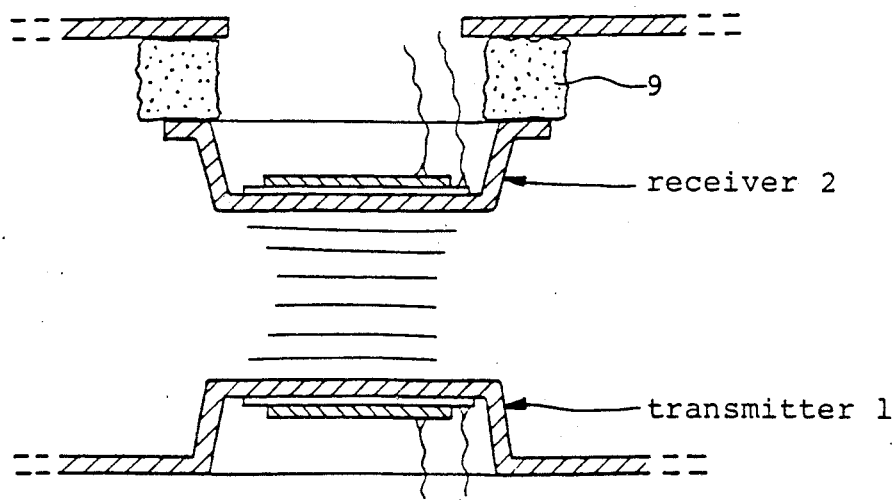
FIG. 9 is a sectional view of the transmitter and the receiver.
Figure 10:
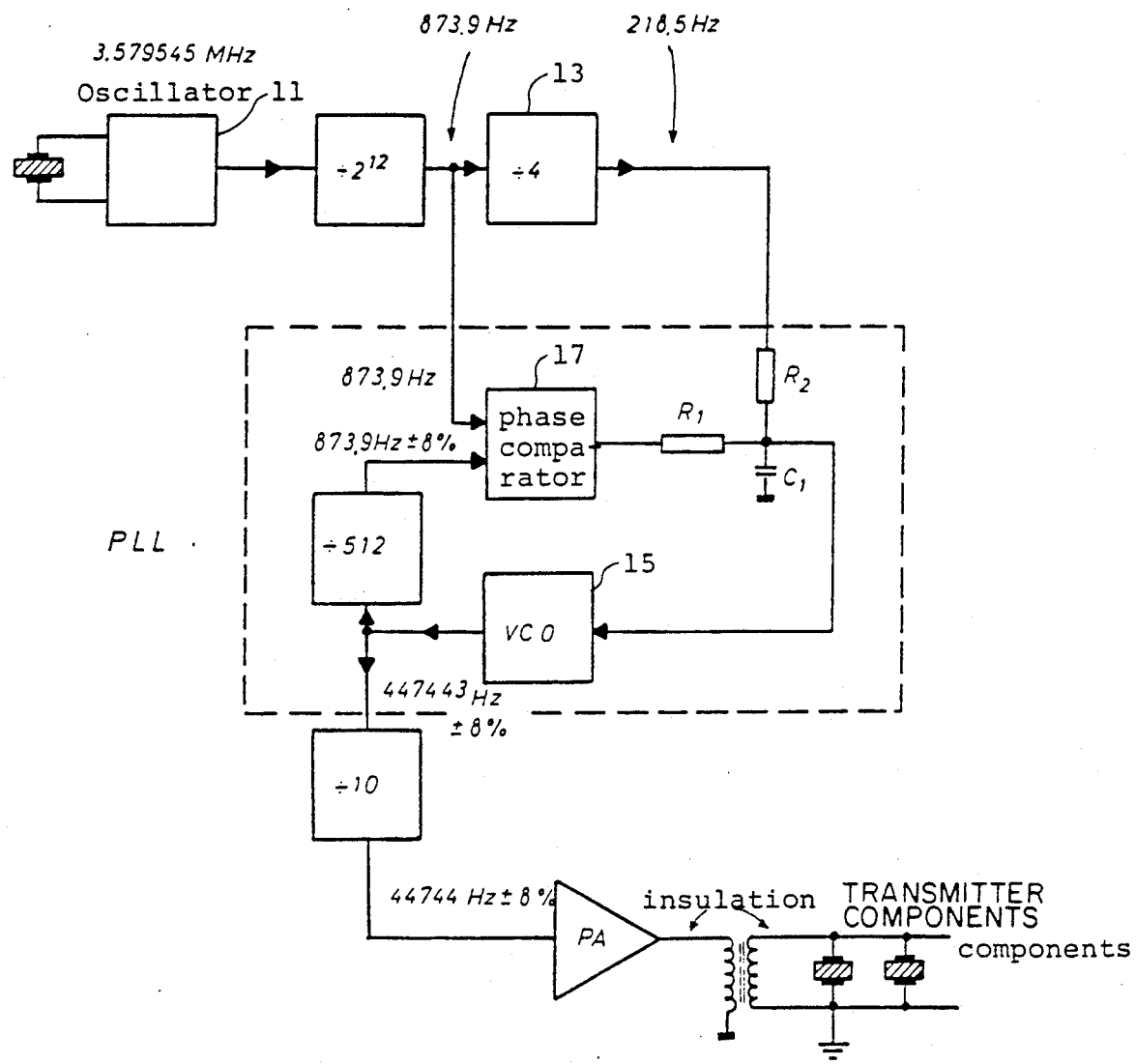
FIG. 10 illustrates the electronic circuit of the transmitter.

A circular, thin membrane fastened at its edge by an (infinitely large) ring has a well-defined resonance. The resonance is a function of the diameter and the thickness of the membrane as well as the parameters of the membrane material (speed of sound and mass). When a piezoceramic crystal 7 is glued to the membrane an electromechanical resonator is obtained, as the expansion and contraction of the crystal 7 in the radial direction of the membrane is conveyed to the membrane. This causes the membrane 5a to vibrate in an axial direction, cf. FIG. 7. Depending on the parameters of the piezoceramic crystal 7, the frequency of the membrane is slightly affected when the crystal 7 is glued to the membrane. When a frusto conical elevation is pressed out of the thin plate by means of a mandril a membrane is defined at the ring of flexion and the sides of the frustum of the cone, cf. FIG. 8. Such a membrane has a resonance frequency close to the resonance frequency of the ideal (above) membrane. It is necessary to either attenuate the plate around the resonator with glued-on rubber or completely remove the plate around the resonator by punching a hole in the plate, cf. FIG. 9, since the thin plate tends to vibrate. In the present use, the components are positioned in pairs opposite each other and the introduced film 4 attenuates the signal to the receiver. As a result a weak signal is an indication for a film in the space between transmitter and receiver. It is thus important for the receiver 2 not to receive interfering signals. Such interfering signals include:

(A) sound transmitted through the transmitter material
(B) sound transmitted through the motor, travel, transformers,
(C) noise transmitted by air
(D) electric noises A is the most important source of interfering signals, as the frequency interval falls within the maximum sensitivity interval of the receiver 2. It is also to be expected that the frequencies around the 45 kHz used propagate substantially unattenuated in metal and the like. Thus the receiver 2 and optionally the transmitter 1 have to be mounted in such a way that sound transmitted through surrounding material is attenuated as much as possible. This is achieved by fastening the receiver to a distance piece 9 of sound-absorbing material, such as foam rubber or polyurethane of low density. Propagation from the transmitter is attenuated by gluing rubber of compact polyurethane around the transmitter.

B causes normally only problems at low frequencies. When the activity of the receiver is limited at low frequencies, only, e.g., travel directed directly against the receiver causes interfering signals, when the above-described arrangement is used.

C occurs rather infrequently at low sensitivities and low frequencies, as the sound pressure in the space between the transmitter and the receiver is relatively high (90-100 dB).

D can be eliminated by means of good electric screening of the components of the receiver.

Crystal-Controlled Frequency Sweep

The center frequency is controlled by a 3.57 MHz crystal 11, said frequency being divided down to 873 Hz used as the reference frequency for a phase-locked loop PLL. At 13 the 873 Hz are further divided by 4 to 218 Hz which is fed into the VCO 15 of the PLL. Since the sweeping frequency of 218 Hz is ¼ of the reference frequency, it is possible to sweep with ±⅛ corresponding to 12% without problems for the phase comparator 17.

Figure 11:
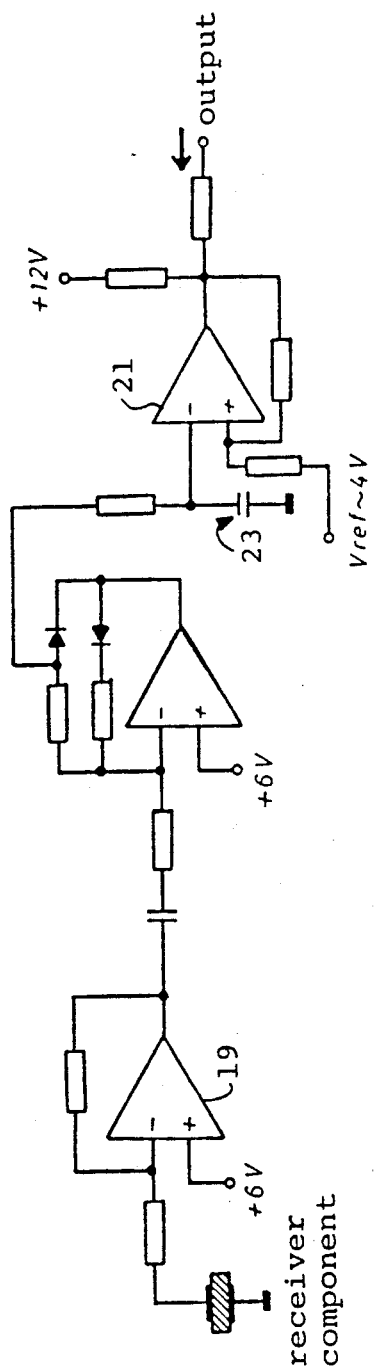
FIG. 11 illustrates the electronic circuit of the receiver.
Figure 12:
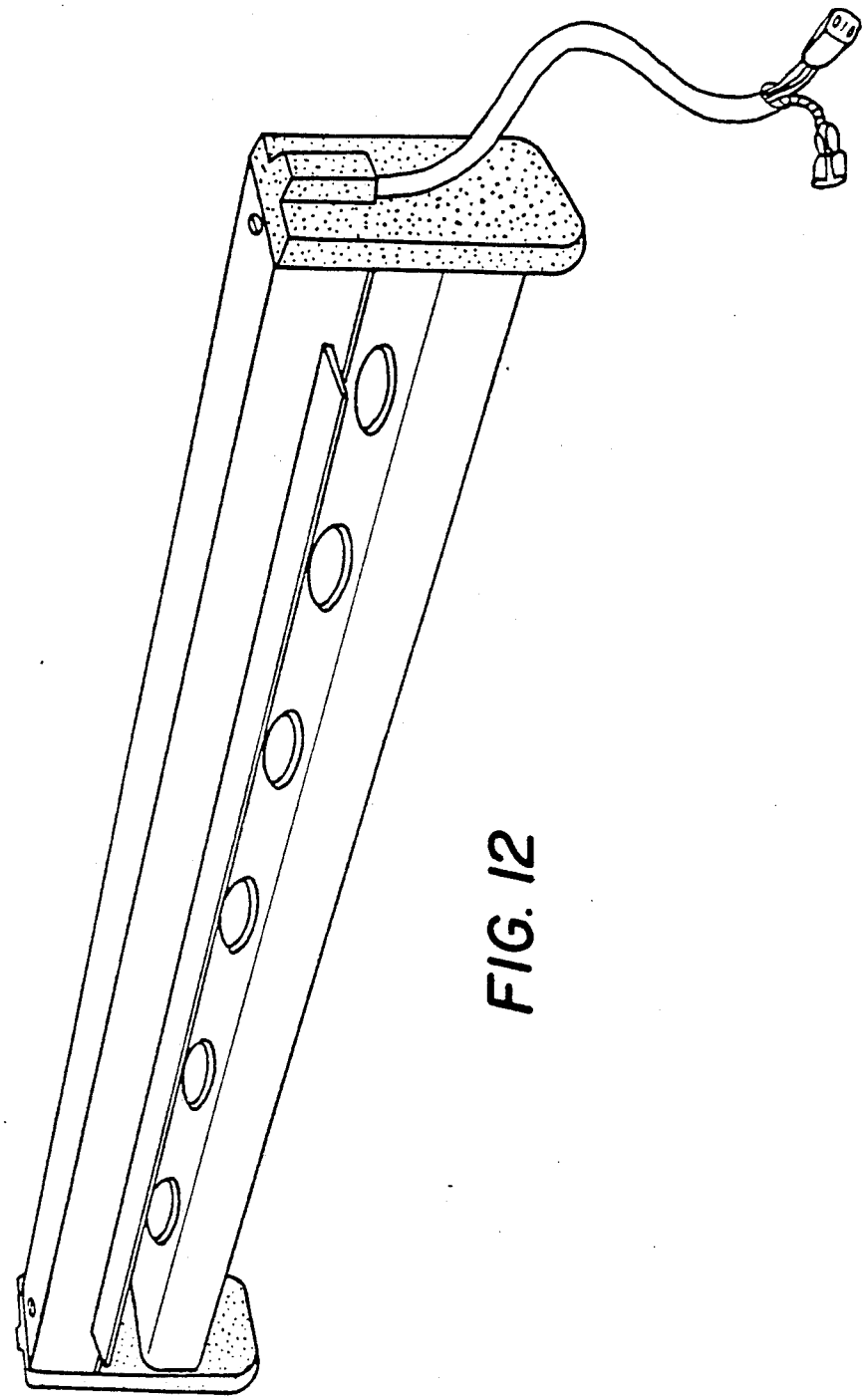
FIG. 12 shows the entire ultrasound detector.

The piezoelectric receiver component, cf. FIG. 11, is of an impedance equivalent to a capacity where the first amplifying step 19 has the character of a high-pass filter. The amplifier 19 is followed by another high-pass filter at the input of the next step constituting a single rectifier. The high-pass filter increases the cutting-off of low frequencies to 40 dB/decade. The rectified signal charges a capacitor 23 via a diode and a resistor and discharges via a resistor, the resistance of which is increased by the factor 100 compared to the first resistor. A comparator 21 compares the voltage at the capacitor 23 with a reference voltage.

The inventive detector is preferably used in connection with a developer machine for detecting the front and back edge of a film and thus the area of the film for controlling the regeneration of developer liquids. The consumption of developer liquids is usually ½ 1 per m² film at a blackening of 50%.

I claim:

1. An ultrasonic detector for a thin film, comprising:
   at least one ultrasonic transmitter confrontingly spaced apart a given distance from a respective ultrasonic receiver arranged for receiving ultrasound transmitted by said transmitter, as said transmitter transmits ultrasound which continuously varies with time, between upper and lower ultrasonic frequencies which are respectively greater than and less than a given ultrasonic frequency;
   said given distance substantially corresponding to an integral multiple of one-half a wavelength of said ultrasound at said given ultrasonic frequency, whereby changes in reception which occur due to air temperature and humidity as film which is thin in relation to said distance is advanced through a gap defined between said transmitter and receiver are accommodated.

2. A method for detecting the presence a thin film advancing through a space, comprising:
   (a) providing at least one ultrasonic transmitter confrontingly spaced apart a given distance from a respective ultrasonic receiver arranged across said space from one another so that said ultrasonic receiver is arranged for receiving ultrasound transmitted by said transmitter;
   (b) while advancing a plastic film through said space, transmitting from said ultrasonic transmitter ultrasound at a frequency which continuously varies with time, between an upper ultrasonic frequency and a lower ultrasonic frequency which are respectively greater than and less than a given ultrasonic frequency;
   while conducting step (b), disposing said film at a distance from one of said transmitter and said receiver which is substantially equal to an odd integer times one-quarter of the wavelength of said ultrasound at said given ultrasonic frequency;
   said given distance substantially corresponding to an integral multiple of one-half a wavelength of said ultrasound at said given ultrasonic frequency, whereby changes in reception which occur due to air temperature and humidity as a film which is thin in relation to said distance is advanced through a gap defined between said transmitter and receiver are accommodated.

3. The method of claim 2, wherein:
   said film is disposed at a distance from said transmitter which is substantially equal to one-quarter of the wavelength of said ultrasound at said given ultrasonic frequency.

4. The method of claim 2, wherein:
   said film is disposed at a distance from said receiver which is substantially equal to one-quarter of the wavelength of said ultrasound at said given ultrasonic frequency.

5. The method of claim 2, wherein:
   said given ultrasonic frequency is on the order of 45 kHz.

6. The method of claim 5, wherein:
   said upper and lower ultrasonic frequencies are respectively on the order of 218 Hz greater than and less than said given ultrasonic frequency.

7. The method of claim 2, wherein:

said ultrasonic transmitter is operated to provide a resonance chamber with standing waves between said transmitter and said receiver, and said film is disposed at a distance from said transmitter which is substantially equal to one-quarter of the wavelength of said ultrasound at said given ultrasound frequency.

8. The method of claim 7, wherein:
said distance between said transmitter and said receiver is substantially equal to one wavelength of said ultrasound at said given ultrasonic frequency.
9. The method of claim 2, wherein:
said plastic film has a thickness on the order of 0.10 to 0.50 mm.

* * * * *